(12) United States Patent
Bi et al.

(10) Patent No.: US 12,087,931 B2
(45) Date of Patent: Sep. 10, 2024

(54) HYBRID BATTERY SYSTEM WITH MULTIPLE DISCHARGE VOLTAGE PLATEAUS AND GREATER CHARGE CAPACITY OF METAL IN THE NEGATIVE ELECTRODE

(71) Applicant: CNPC USA Corporation, Houston, TX (US)

(72) Inventors: Wu Bi, Katy, TX (US); Xiongwen Yang, Beijing (CN); Jiaxiang Ren, Houston, TX (US); Peng Cheng, Houston, TX (US)

(73) Assignee: CNPC USA Corporation, Houston, TX (US)

( * ) Notice: Subject to any disclaimer, the term of this patent is extended or adjusted under 35 U.S.C. 154(b) by 694 days.

(21) Appl. No.: 17/130,996

(22) Filed: Dec. 22, 2020

(65) Prior Publication Data

US 2021/0194079 A1 Jun. 24, 2021

Related U.S. Application Data

(60) Provisional application No. 62/952,596, filed on Dec. 23, 2019.

(51) Int. Cl.
| | |
|---|---|
| *H01M 12/08* | (2006.01) |
| *H01M 4/133* | (2010.01) |
| *H01M 4/134* | (2010.01) |
| *H01M 4/38* | (2006.01) |
| *H01M 4/62* | (2006.01) |
| *H01M 10/0569* | (2010.01) |

(Continued)

(52) U.S. Cl.
CPC .......... *H01M 12/08* (2013.01); *H01M 4/133* (2013.01); *H01M 4/134* (2013.01); *H01M 4/381* (2013.01); *H01M 4/622* (2013.01); *H01M 10/0569* (2013.01); *H01M 10/44* (2013.01); *H01M 50/446* (2021.01); *H01M 2300/0037* (2013.01)

(58) Field of Classification Search
CPC ..... H01M 12/08; H01M 10/0569; H01M 6/14
See application file for complete search history.

(56) References Cited

U.S. PATENT DOCUMENTS

| | | |
|---|---|---|
| 4,246,327 A | 1/1981 | Skarstad |
| 4,252,875 A | 2/1981 | Venkatasetty |

(Continued)

FOREIGN PATENT DOCUMENTS

| | | |
|---|---|---|
| CN | 10470989 | 6/2015 |
| ES | 8704292 | 3/1987 |

*Primary Examiner* — Stephan J Essex
(74) *Attorney, Agent, or Firm* — Craft Chu PLLC; Andrew W. Chu

(57) ABSTRACT

The hybrid battery system has multiple discharge voltage plateaus and a greater charge capacity of metal in the negative electrode, while still having sufficient energy density and sufficient power capability to supply external devices. The charge capacity of the negative side is higher than the charge capacity of the positive side. There are two solvent compositions in the cathodic solution, and there is a transition from a first discharge voltage plateau to a second discharge voltage plateau at a voltage less than the first discharge voltage plateau. The battery system is safe, and the transition between discharge voltage plateaus provides an estimation of battery capacity that can indicate when the battery system is running out of power.

19 Claims, 5 Drawing Sheets

(51) Int. Cl.
  *H01M 10/44* (2006.01)
  *H01M 50/446* (2021.01)

(56) References Cited

U.S. PATENT DOCUMENTS

| | | | |
|---|---|---|---|
| 4,503,088 A | 3/1985 | Fleisher | |
| 4,842,967 A * | 6/1989 | Binder | H01M 6/14 429/105 |
| 7,882,622 B2 | 2/2011 | Polsonetti | |
| 8,119,276 B2 | 2/2012 | Johnson et al. | |
| 8,889,300 B2 | 11/2014 | Bugga et al. | |
| 8,961,833 B2 | 2/2015 | Zhang et al. | |
| 9,997,789 B2 | 6/2018 | Lee et al. | |
| 2003/0049524 A1* | 3/2003 | Spillman | H01M 4/40 429/231.95 |
| 2014/0017558 A1 | 1/2014 | Lockett et al. | |

\* cited by examiner

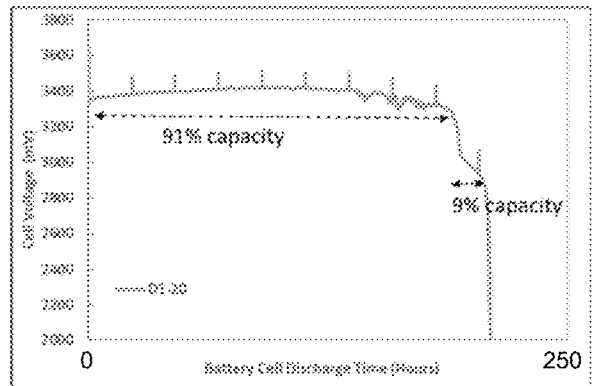
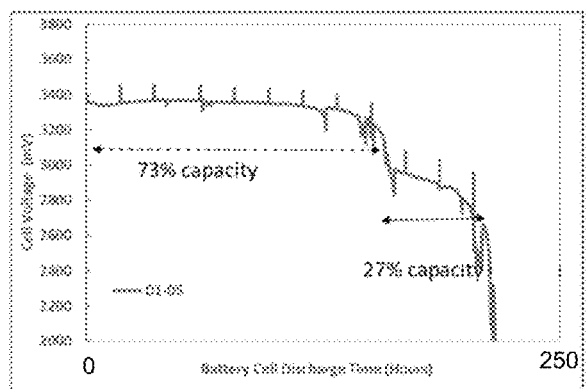
FIG. 5
FIG. 6
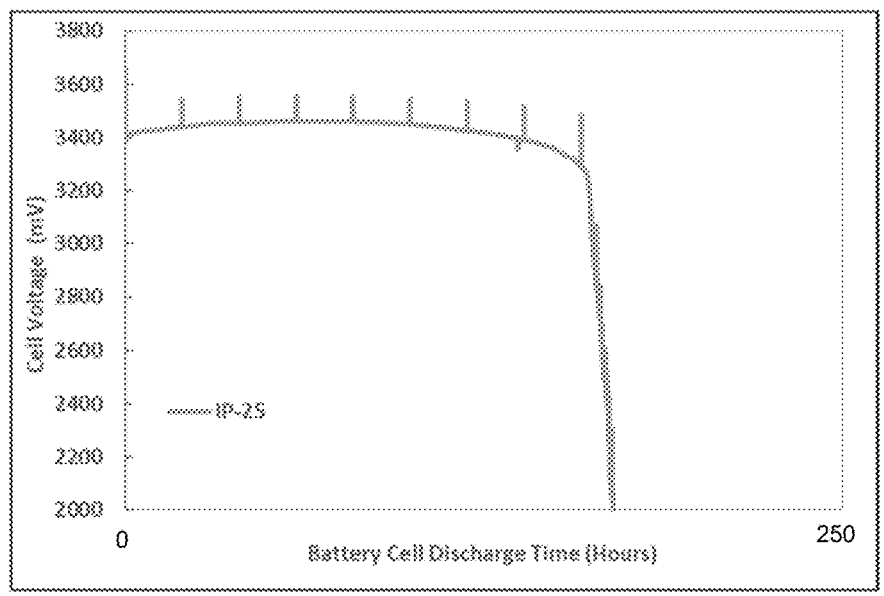
FIG. 7

HYBRID BATTERY SYSTEM WITH MULTIPLE DISCHARGE VOLTAGE PLATEAUS AND GREATER CHARGE CAPACITY OF METAL IN THE NEGATIVE ELECTRODE

CROSS-REFERENCE TO RELATED APPLICATIONS

The present application claims priority under 35 U.S.C. Section 119(e) from U.S. Provisional Patent Application Ser. No. 62/952,596, filed on 23 Dec. 2019, entitled "HYBRID BATTERY SYSTEM WITH MULTIPLE DISCHARGE VOLTAGE".

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a limited power supply. More particularly, the present invention relates to a battery with both multiple discharge voltage plateaus and greater charge capacity on the negative side to supply safe and sufficient power. Even more particularly, the present invention relates to a hybrid battery for tools in the oil and gas industry with a warning before loss of battery power.

2. Description of Related Art Including Information Disclosed Under 37 CFR 1.97 and 37 CFR 1.98

The conventional lithium batteries have a negative electrode or anode on the negative side of the battery. The negative electrode can be an alkaline metal, that is, lithium. Other alkaline earth metals, mixtures and alloys are also possible for analogous metal batteries. On the positive side of the battery, the positive electrode or cathode is a carbon electrode, which is porous and can contain carbon black and inert polymer binders. There is also a battery electrolyte solution, that can include liquid thionyl chloride, which is a typical energy active material reacted on the carbon electrode. A porous carbon electrode provides reaction sites for energy active material reactions and is directly connected to a current collector for electricity on the positive side of the battery.

Lithium thionyl chloride batteries are used in the oil and gas industry, aerospace, and memory backup power devices. The lithium thionyl chloride battery is selected for these applications due to their functionality through a wide temperature range, from −40° C. to more than 180° C. There are known efforts to increase battery capacity and energy density (longer battery life) of these known batteries.

For example, the lithium metal in the negative electrode has a melting pointing of 180° C., which limits the upper operating temperature of the overall battery. Thus, lithium alloys, such as $Li_xMg_{(1-x)}$ or other metals, such as calcium, can be substituted in order to increase maximum operating temperature. However, the selection of material can be complicated. Adding magnesium to make an alloy with lithium in the negative electrode or anode results in poor battery performance around and below room temperature, depending on the magnesium content in the alloy.

A known limitation of the lithium thionyl chloride battery is that reaction products, including insoluble lithium chloride and sulfur particles, clog the surface of the carbon electrode. Reaction rate is decreased with fewer reaction sites. Hence, battery discharge resistance increases, and discharge power decreases. A portion of thionyl chloride can be trapped within the pores of the clogged carbon electrode. These trapped portions of thionyl chloride can no longer react and can no longer provide battery capacity or energy. More importantly, these batteries become dangerous due to sudden increases of internal temperature and pressure as battery discharge resistance increases. In the conventional lithium thionyl chloride battery, thionyl chloride ($SOCl_2$) is the sole solvent and cathode energy-active chemical in the battery. There is also a battery electrolyte salt, such as $LiAlCl_4$ in the $SOCl_2$ solvent. After the lithium thionyl chloride battery is appropriately depassivated if needed, a typical working battery voltage is above 3.0 V depending on discharge current density at initial discharge. Such a working battery is capable of providing initial sufficient power to external application devices until voltage crashes to a typical defined cutoff value of 1.0-2.0 V depending on the external application device. Eventually, voltage decreases to zero for no power. With battery discharge over time, more and more thionyl chloride is consumed, or less and less thionyl chloride is available as the electrolyte solvent remains. The electrolyte salt concentration gradually increases to over 1.8M per liter, so that electrolyte conductivity gradually decreases as the concentration increases higher than 1.8M per liter. At a saturation level of about 4.6M, the electrolyte salt such as $LiAlCl_4$ will start to precipitate out. This precipitation also results in battery discharge resistance increases and then rapid voltage drop of the battery. If the battery user is not notified to stop discharging before the rapid voltage drop, then the battery is forced to continue discharging. Battery reversal will happen. Battery temperature and internal pressure can increase rapidly and may cause explosion.

The previous solution has been to provide an excess amount of thionyl chloride to keep the electrolyte salt dissolved and to maintain the electrolyte conductivity level, even while a portion of the thionyl chloride is consumed while discharging at the initially sufficient power around 3.0V or higher. Typically, discharging at about 1.0 to 2.0 V is a cutoff voltage, indicating discharging without sufficient power for the external device, before the battery is discharging at no power, 0V. Hence, the theoretical or practical charge capacity (Ah) of metal in the negative electrode must be lower than the theoretical or practical charge capacity (Ah) of all thionyl chloride, so that a portion of thionyl chloride remains to maintain electrolyte salt dissolved. Thus, the conventional lithium thionyl chloride battery's capacity (Ah) is limited by the quantity or mass (grams) of the anode lithium metal. The battery's energy density (wh/L) also depends on the excess amount of thionyl chloride for battery safety.

While discharging at initial sufficient power, sulfur dioxide ($SO_2$) is generated according to the following reaction:

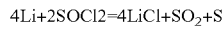

Part of the $SO_2$ gas can be dissolved in the excess amount of thionyl chloride so that battery internal pressure can be reduced to further ensure battery safety.

The battery electrolyte solution has also been modified to raise the charge capacity or energy density of the battery. More energy active materials must be packed in the fixed battery volume. For example, there are additives to the battery electrolyte solution as a positive cathodic solution. U.S. Pat. No. 4,246,327, issued on 20 Jan. 1981 to Skarstad et al, U.S. Pat. No. 4,252,875, issued on 24 Feb. 2081 to Venkatasetty, U.S. Pat. No. 8,119,276, issued on 21 Feb. 2012 to Johnson et al, and U.S. Pat. No. 8,889,300, issued on 18 Nov. 2014 to Bugga et al, all include additives, including dimethyl sulfoxide (DMSO) to the positive cathodic solution.

Both of the lithium anode and the carbon electrode are modified to improve on the lithium thionyl chloride battery. The composition of the negative electrode and carbon electrode can be altered, as disclosed in U.S. Pat. No. 4,503,088, issued on 5 Mar. 1985 to Fleisher, U.S. Pat. No. 7,882,622, issued on 8 Feb. 2011 to Polsonetti, and U.S. Pat. No. 8,961,833, issued on 24 Feb. 2015 to Zhang et al. Chinese Patent No. CN 10470989, issued on 17 Jun. 2015 to Li et al, also teaches modifications of the carbon structure to have larger pores to prevent blockages. Spanish Patent No. ES 8704292, issued on 16 Mar. 1987 to Union Carbide, alters the lithium anode by adding a coating, and US Patent Publication No. 2014/0017558, published on 16 Jan. 2014 for Lockett et al, added a separator within the battery cell.

In addition to improvements in energy density and power capacity, there is a need to estimate battery remaining capacity so that battery users can be notified before the rapid decrease of battery voltage near the end of the service life of the battery. The conventional lithium thionyl chloride battery, or lithium sulfuryl chloride battery has a very flat discharge voltage profile followed by a rapid voltage crash past any cutoff voltage and quickly to zero. For example, the lithium thionyl chloride battery has a typical flat voltage curve around 3.2-3.5V depending on discharge load and temperature. Once the battery is close to being fully discharged of all power, there is a sharp decrease in voltage from about 3.0 V to 0.0V. There is very little warning that the battery is going stop providing voltage. There is no way to determine a state of charge (SOC %) without precise electric charge (Ah) measurements by additional electric devices. These electric devices or so called battery capacity chips often have poor accuracy of capacity estimation due to a limited data sampling frequency. The sharp decreasing rate of voltage affects industries, like the oil and gas industry, because these conventional batteries are not easily or quickly replaced. The installation of these batteries in downhole locations and other remote locations prevent easy and quick replacement of batteries. Without much warning, underground working tools powered by these batteries may fail due to batteries losing power. Loss of working hours for downhole operations is very expensive. Thus, the usefulness and reliability of power from lithium batteries restrict the use of these batteries. By providing notice of a gradual and noticeable battery discharge voltage decrease before the voltage crash and a complete de-powering, the batteries can be replaced before failure of the device. U.S. Pat. No. 9,997,789, issued on 12 Jun. 2018 to Lee et al discloses two-stage discharging from a lithium battery. These two stages are known to give warning of imminent power loss.

It is an object of the present invention to provide a safe hybrid battery system with multiple discharge voltage plateaus and greater charge capacity of metal in the negative electrode.

It is an object of the present invention to provide a battery system with multiple discharge voltage plateaus and greater charge capacity of metal in the negative electrode with sufficient energy density.

It is an object of the present invention to provide a battery system with multiple discharge voltage plateaus and greater charge capacity of metal in the negative electrode with sufficient power capability.

It is an object of the present invention to provide a battery system with multiple discharge voltage plateaus and greater charge capacity of metal in the negative electrode with estimation of battery capacity.

It is another object of the present invention to provide a battery system with multiple discharge voltage plateaus and greater charge capacity of metal in the negative electrode with a transition from a first discharge voltage plateau to a second discharge voltage plateau as an indicator of battery capacity remaining.

It is still another object of the present invention to provide a battery system with multiple discharge voltage plateaus and greater charge capacity of metal in the negative electrode with a transition from a first higher discharge voltage plateau to a second lower discharge voltage plateau as an indicator of loss of battery capacity.

It is still another object of the present invention to provide a battery system with multiple discharge voltage plateaus and greater charge capacity of metal in the negative electrode with more time between discharging at initial sufficient power and discharging at zero.

It is an object of the present invention to provide a battery system with multiple discharge voltage plateaus and a charge capacity of the negative side higher than a charge capacity of the positive side.

It is another object of the present invention to provide a battery system with multiple discharge voltage plateaus and a charge capacity of metal in the negative electrode higher than a charge capacity of a positive cathodic solution.

It is an object of the present invention to provide a hybrid battery system with a lower initial electrolyte salt concentration.

These and other objectives and advantages of the present invention will become apparent from a reading of the attached specification.

BRIEF SUMMARY OF THE INVENTION

Embodiments of the battery system of the present invention maintain power standards and safe operational standards, while providing multiple discharge voltage plateaus and reversing the relationship between charge capacities of the negative electrode and positive cathodic solution. The battery system includes a battery cell with a negative terminal and a positive terminal. An external electric application device is removably attachable to the terminals so as to be powered by the battery system. The battery system includes a negative electrode, being comprised of an electrode metal and being connected to the negative terminal, and a carbon electrode being comprised of carbon materials and being connected to the positive terminal. There is a separator layer between the negative electrode and the carbon electrode so as to divide the battery cell into a negative side and a positive side. A cathodic solution within the battery cell is in contact with the negative electrode, the separator layer, and the carbon electrode. The cathodic solution comprises a first solvent composition, a second solvent composition, and an electrolyte salt.

The electrode metal of the negative electrode has an electrode metal charge capacity on the negative side of the battery, and, on the positive side of the battery, the cathodic solution has a positive charge capacity. The electrode metal charge capacity is higher than the positive charge capacity. Additionally, the cathodic solution has an initial electrolyte salt concentration less than 2.4M per liter. The battery cell has a plurality of discharge voltage plateaus. When there is a transition from one discharge voltage plateau to another discharge voltage plateau detected, the battery life remaining and the need to replace the battery can be assessed with sufficient time to replace the battery. Hence, forced battery over-discharge or battery voltage reversal can be avoided to maintain safe battery operation.

Particular embodiments of the battery system according to the present invention include the first solvent composition being comprised of nitrobenzene, the electrode metal of the negative electrode being lithium, and the second solvent composition being comprised of thionyl chloride. The first and second solvent compositions are dynamic. For example, thionyl chloride can be the second solvent composition as an initial chemical compound, and there will be second solvent reaction products. The second solvent reaction products can be comprised of sulfur, sulfur dioxide, and a metal polysulfide.

Embodiments of the present invention include the method of powering external devices with the battery cell. There is an initial sufficient discharging at a first discharge voltage plateau to power an external device. There is a transition to a second discharge voltage plateau, which may also be discharging sufficient to power the device. The second discharge voltage plateau is lower than the first discharge voltage plateau. Detecting the transition allows a user to estimate the remaining battery life.

The present invention provides a safe battery system with multiple discharge voltage plateaus and greater charge capacity of metal in the negative electrode, while still having sufficient energy density and sufficient power capability to supply external devices.

BRIEF DESCRIPTION OF THE SEVERAL VIEWS OF THE DRAWINGS

FIG. 5 is a graph illustration of cell voltage over time, according to a battery system of the present invention.

FIG. 6 is a graph illustration of cell voltage over time, according to another embodiment of a battery system of the present invention.

FIGS. 7-10 are graph illustrations of cell voltage over time, according to battery systems outside of the present invention.

DETAILED DESCRIPTION OF THE INVENTION

Figure 1:
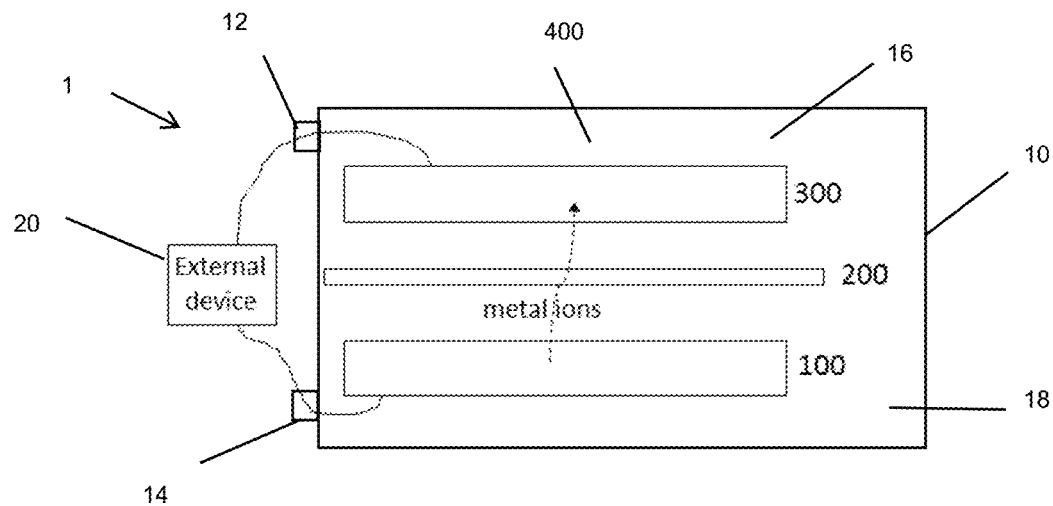
FIG. 1 is a schematic view of an embodiment of the battery system according to the present invention.

In battery systems of the prior art, the charge capacity (Ah) of lithium in the negative electrode of a conventional lithium battery must be lower than the charge capacity (Ah) of all thionyl chloride in the cathodic solution. The amount of thionyl chloride in the cathodic solution is typically relatively large to keep electrolyte salt dissolved and absorb a portion of sulfur dioxide gas. Battery discharge battery cell resistance increase can be minimized, and battery internal pressure increase can be minimized for safety.

The battery system of the present invention is a major breakthrough against the conventional lithium battery. In the present invention, the amount of lithium metal can be increased so that the charge capacity as anodic capacity is higher than the total cathodic capacity of the cathodic solution, while the battery system remains safe. It is well known that there is a maximum or theoretical value of charge capacity of energy-active materials or chemicals, such as lithium metal or thionyl chloride, and there is a lower value of charge capacity that can be practically realized. Herein, charge capacity means practical charge capacity. The battery system of the present invention with a low initial electrolyte salt concentration can also generate sufficient strong voltage to power the same devices as powered by conventional lithium batteries. The dangers of electrolyte salt saturation, sudden increase of battery resistance, rapid voltage drops and battery reversal are avoided, even though there is more lithium, less energy active solvent in the cathodic solution, and less initial electrolyte salt concentration.

The battery system of the present invention can maintain the sufficient energy density and safe operational standard, while providing multiple discharge voltage plateaus and reversing the relationship between charge capacities of the negative electrode and positive cathodic solution. The cathodic solution of the present invention includes more than one solvent composition as a hybrid cathodic solution. The cathodic solution is not based on a sole solvent. Each solvent composition generates its own reaction products and pathways. These reaction products and pathways from the system of solvent compositions are compatible for the larger amount of metal, smaller amount of energy active second solvent composition in a hybrid cathodic solution, and smaller amount of initial electrolyte salt concentration for safe operation of this new battery system.

In some embodiments of the present invention, the cathodic solution is comprised of a first solvent composition and a second solvent composition of thionyl chloride. An excess amount of thionyl chloride in a conventional lithium thionyl chloride battery can be replaced with the first solvent composition, which can also dissolve electrolyte salt, such as $LiAlCl_4$. The first solvent composition can also participate in battery discharge reactions generating a respective discharge voltage plateau different from the discharge voltage plateau generated by thionyl chloride as the second solvent composition. There are at least two discharge voltage plateaus: a discharge voltage plateau with the second solvent composition (thionyl chloride) and a discharge voltage plateau without the second solvent composition (thionyl chloride), when none of the second solvent composition remains after being reacted. In some embodiments, the first solvent composition has a boiling point higher than a boiling point of the second solvent composition, such as thionyl chloride (boiling point of 74.6° C.). Thus, battery internal pressure can be minimized under hot downhole drilling conditions. In a particular embodiment, the first solvent composition is comprised of nitrobenzene (NB) with a boiling point of 211° C. and the electrolyte salt is $LiAlCl_4$. Nitrobenzene has a good solubility for $LiAlCl_4$ as the electrolyte salt. In addition, nitrobenzene can be electrochemically reduced during discharging at initial sufficient power so as to form no gaseous products and minimize battery internal pressure for additional safety.

FIG. 1 shows a schematic view of an embodiment of the battery system 1 of the present invention. The battery system 1 includes a battery cell 10 being comprised of a negative terminal 14 and a positive terminal 12. An external electric application device 20 can be attached to the positive terminal 12 and the negative terminal 14 so as to be powered by the battery system 1.

Embodiments of the battery system 1 include a negative electrode 100 being comprised of an electrode metal and being connected to the negative terminal 14. The electrode metal is an alkaline metal or an alkaline earth metal. In some embodiments, the electrode metal is selected from a group consisting of Li, Na, Ca, Mg. In other embodiments, the electrode metal is an alloy. The alloy can be comprised of at least two different metals, corresponding to an alkaline metal or alkaline earth metal mixed with a different alkaline metal or alkaline earth metal.

FIG. 1 further shows the battery system 1 including a carbon electrode 300 being comprised of carbon materials and being connected to the positive terminal 12, and a separator layer 200 between the negative electrode 100 and the carbon electrode 300 so as to divide the battery cell into a negative side 18 and a positive side 16. The separator 200 can be comprised of glass fiber or a polymer. The polymer can be polypropylene or polyethylene. The separator 200 prevents direct contact between the negative electrode 100 and the carbon electrode 300; however, the separator 200 remains permeable to metal cations, which can pass from the negative electrode 100 to the carbon electrode 300. As shown in FIG. 1, the negative electrode 100 is positioned in the negative side 18, the carbon electrode 300 is positioned in the positive side 16.

The negative electrode 100 can be a thin layer metal foil or a thin metal film. The negative electrode 100 is comprised of metal atoms that can be electrochemically oxidized to metal ions and electrons. The metal ions transport through the separator layer 200 into the positive side 16 so as to participate in reductive reactions with active materials in the positive side 16. The electrons pass through the negative terminal 14 to an external electric application device 20 and from the external electric application 20 to the positive terminal 12 so as to complete electrochemical reduction reaction at the carbon electrode 300.

Figure 2:
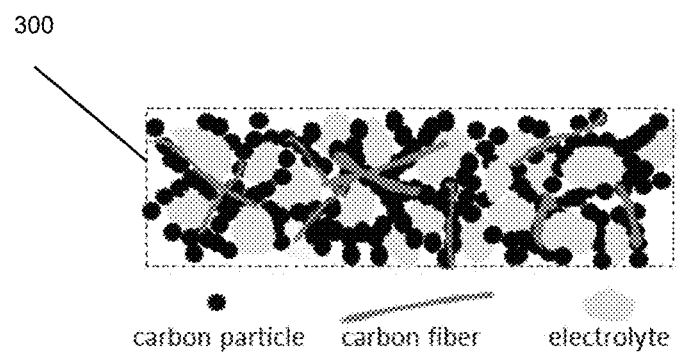
FIG. 2 is a schematic view of an embodiment of the carbon electrode of the battery system according to the present invention.

FIG. 2 shows a schematic view of the carbon electrode 300 having porous structures formed by carbon particles and carbon fiber. Electrolyte can fill the porous structures. In some embodiments, the carbon electrode 300 is further comprised of inert polymer binders for strength or stability. The carbon electrode 300 as the "positive electrode" can contain one or more types of carbon materials preferably reinforced with inert binders such as polytetrafluoroethylene. FIG. 2 shows a schematic view of the positive electrode's microstructures containing carbon materials such as spherical carbon particles and carbon fibers with pores filled with electrolyte. Inert binder not shown in FIG. 2 is preferred to provide electrode integrity and mechanical strength.

The carbon electrode 300 may be referred to as a "positive electrode", but the carbon electrode is not an energy-active cathode. In some embodiments, the carbon electrode 300 can be further comprised of sulfur particles mixed in the carbon materials. In the present invention, the battery system 1 includes a cathodic solution 400, as shown in FIG. 1. The cathodic solution 400 is the energy-active chemical one the positive side of the battery system 1. The separator layer 200 prevents direct contact between the negative electrode 100 and the carbon electrode 300. The separator layer 200 allows metal ions to pass through from the negative side 18 to the positive side 16. Embodiments of the battery system 1 include the positive cathodic solution 400 within the battery cell 10 and in contact with the negative electrode 100, the separator layer, 200 and the carbon electrode 300.

FIG. 1 further shows the battery system 1, comprising the cathodic solution 400 within the battery cell 10 and in contact with the negative electrode 100, the separator layer 200, and the carbon electrode 300. The cathodic solution 400 comprises a first solvent composition, a second solvent composition, and an electrolyte salt.

Embodiments of the present invention include the battery system 1, wherein the electrode metal of the negative electrode 100 has an electrode metal charge capacity, and wherein the cathodic solution 400 has a positive charge capacity. The electrode metal charge capacity is higher than the positive charge capacity. Additionally, the cathodic solution 400 has an initial electrolyte salt concentration less than 2.4M.

Embodiments of the present invention include the battery cell 10 having a plurality of discharge voltage plateaus. A discharge voltage plateau can be defined by discharging within a voltage level range of at least 0.20V or an average voltage +/−0.10V for at least 5% of total battery capacity. Total battery capacity can be the total number of hours of discharging from the battery cell. In some embodiments, the discharge voltage plateau is defined by a voltage level range of at least 0.10V or an average voltage +/−0.05V. Each discharge voltage plateau can be easily identified. For example, there can be a discharge voltage plateau of 3.50V+/−0.10V or 3.40-3.60V and a discharge voltage plateau of 3.10V+/−0.10V or 3.20-3.00V. In some embodiments, there is a first discharge voltage plateau and a second discharge voltage plateau lower than the first discharge voltage plateau. In alternative embodiments, the range of the first discharge voltage plateau is smaller than the range of the second discharge voltage plateau. For example, the first discharge voltage plateau can have a range of 0.10V (average+/−0.05V), while the second discharge voltage plateau has a range of 0.20V (average+/−0.1V). The first solvent composition for the second discharge voltage plateau may have additional different discharge properties, besides the lower voltage discharge, like less consistency, than the second solvent composition for the first discharge voltage plateau.

In the present invention, there is a separation of the averages (3.50V and 3.10V) of at least 0.20V. When a transition between the first discharge voltage plateau and the second discharge voltage plateau is detected, the amount of remaining capacity or battery service time can be estimated. In the present invention, the first discharge voltage plateau can be between 3.0-3.9V as initial sufficient power for an external device, and the second discharge voltage plateau is lower than the first discharge voltage plateau. The predetermined capacity percentage of each discharge voltage plateau can depend on the volume ratio of the two solvent compositions in the cathodic solution. The battery life remaining and the need to replace the battery can now be assessed with sufficient time in advance to replace the battery.

According to the present invention, the first solvent composition of the cathodic solution 400 is comprised of at least one of a group consisting of nitrobenzene, 2-nitro-m-xylene, 4-nitro-m-xylene, benzoyl chloride, 2-methylbenzoyl chloride, 1-nitropropane, ethylene (glycol) sulfite, 3-methyl-2-oxazolidinone, acetonitrile, thiophosphoryl chloride, dimethyl sulfoxide, trimethyl phosphate, carbon tetrachloride, trichloromethane, benzonitrile, methyl benzoate, gamma-butyrolactone, propylene carbonate, 3-methoxy propionitrile, N, N-dimethylformamide, and dimethoxyethane.

According to the present invention, the second solvent composition of the cathodic solution 400 is comprised of at least one of a group consisting of thiondyl chloride ($SOCl_2$), and sulfuryl chloride ($SO_2Cl_2$).

According to the present invention, the electrolyte salt of the cathodic solution 400 is comprised of at least one of a group consisting of metal tetrachloroaluminate (MAlCl4), metal tetrachlorogallate (MGaCl4), Metal tetrachloro borate (MBCl4), metal bis(oxalato)borate (MBOB), metal bis(trifluoromethanesulfonyl)imide (MTFSI), and metal trifluoromethanesulfonate (MTF), metal tetrafluoroborate (MBF4), and metal hexafluoroarsenate (MAsF6).]

Figure 3:
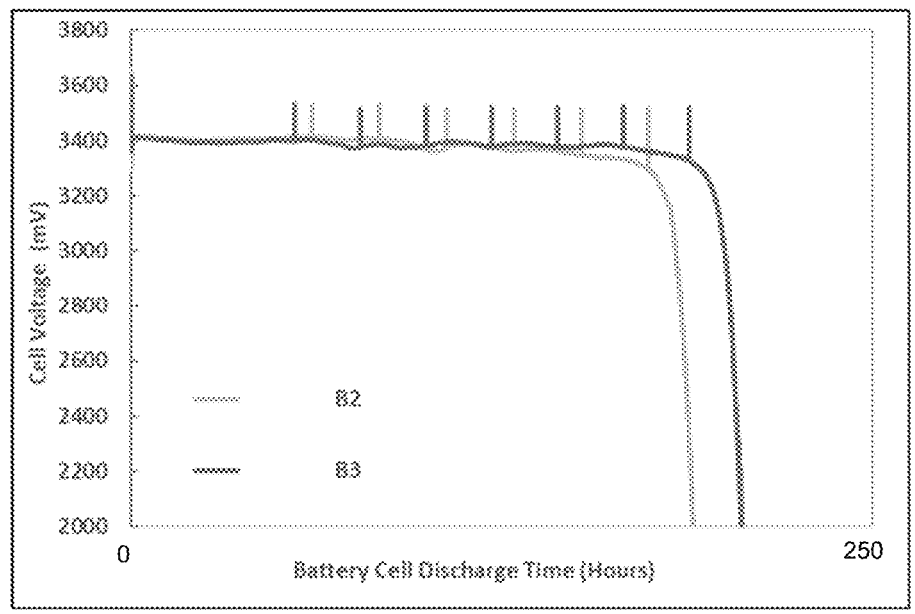
FIG. 3 is a graph illustration of cell voltage over time, according to battery systems of the prior art.
Figure 4:
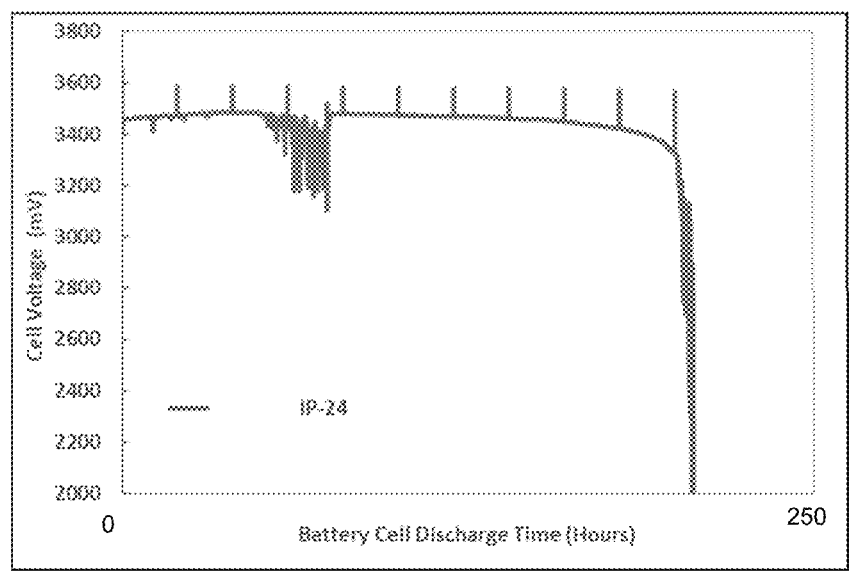
FIG. 4 is another graph illustration of cell voltage over time, according to another battery system of the prior art.

TABLE 1 shows the test results of prior art battery systems and embodiments of the battery system 1 of the present invention FIGS. 3-11 show cell voltage over time of battery cell discharge for each battery cell during constant-current discharge. Discharge current is periodically removed to measure battery open circuit voltage, which shows periodical voltage increase "uptick" lines in FIG. 3-11. FIGS. 3-4 show prior art battery systems. Cells B2 (FIG. 3), B3 (FIG. 3), and IP-24 (FIG. 4) have a charge capacity (Ah) of lithium lower than the charge capacity (Ah) of all thionyl chloride in the cathodic solution. There is only one solvent composition (thionyl chloride) in the cathodic solution of these prior art embodiments. The voltage discharge results show an expected first discharge voltage plateau above 3.0 V as flat, followed by a rapid decay toward zero volts. There is no second discharge voltage plateau. Cell IP-24 has a higher initial electrolyte salt concentration, which results in a first discharge voltage plateau at a cell voltage slightly higher than the first discharge voltage plateaus of Cells B2 and B3. However, there is the same lack of a second discharge voltage plateau and lack of a transition, while still having rapid decay approaching the end of battery usage without a warning. These prior art battery systems perform as expected. It is further expected that there can be additives to either the electrodes or cathodic solution to adjust performance without easy estimation of remaining capacity of the battery before sudden battery power loss.

Figure 11:
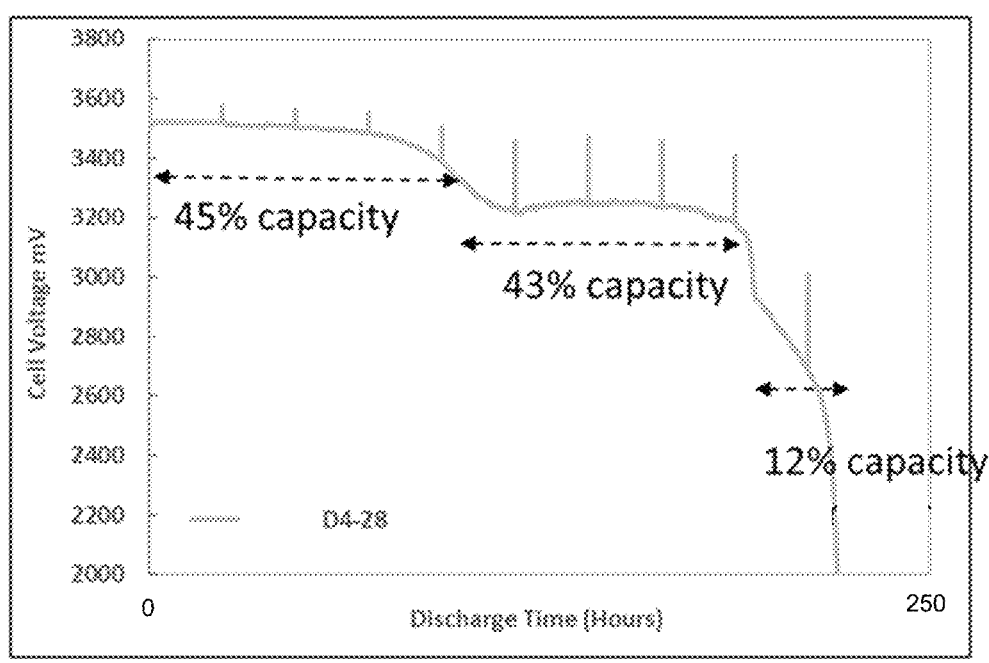
FIG. 11 is a graph illustration of a cell voltage over time, according to an alternative embodiment of the battery system of the present invention.

FIGS. 5-6 and 11 show embodiments of the present invention with the negative electrode metal charge capacity higher than the positive charge capacity. FIG. 11 shows a different first solvent composition than FIGS. 5-6. Each battery cell of the present invention remains safe due to the innovations in the hybrid cathodic solution 400. There were no explosions in testing. Furthermore, Cells D1-20 (FIG. 5) and D1-05 (FIG. 6), and D4-28 (FIG. 11) show sufficient energy density and power capability by having at least one discharge voltage plateau over 3.0V for over 70% of battery capacity, which provides sufficient battery power for almost

TABLE 1

Figure 8:
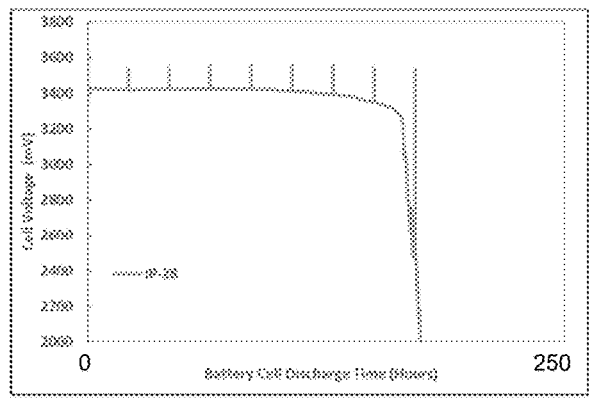
Figure 9:
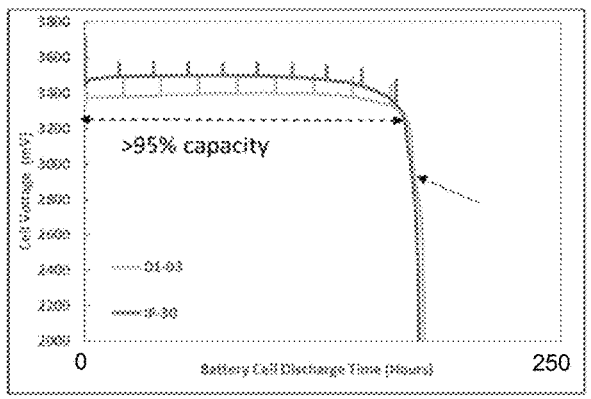
Figure 10:
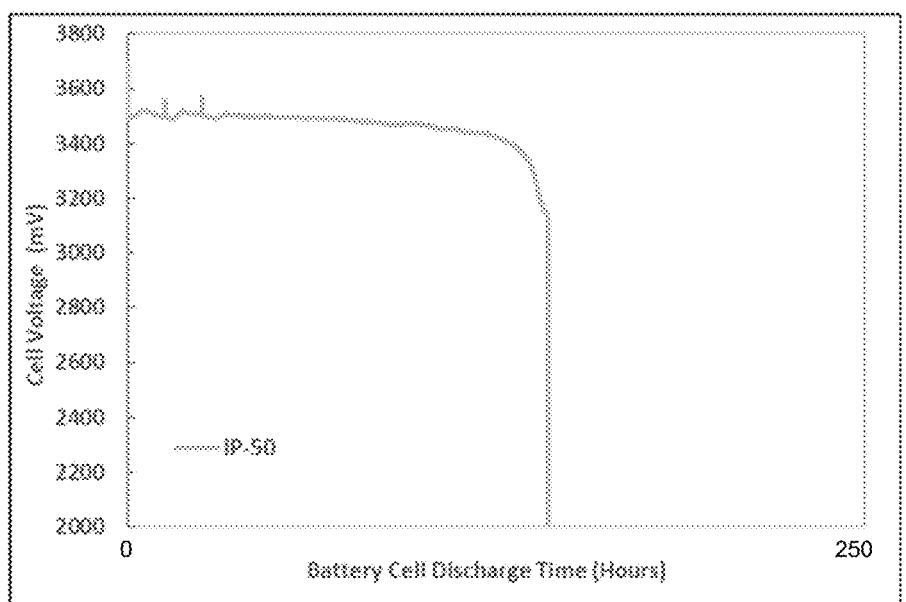

| Cell name | Description | First solvent composition | Second solvent composition | Solvent composition ratio | Charge capacity | Electrolyte salt LiAlCl4 concentration (mol/L) | First Voltage Discharge Plateau | Other Voltage Discharge Plateau |
|---|---|---|---|---|---|---|---|---|
| B02 FIG. 3 | Prior art | — | SOCl2 | — | Neg < Pos | 1.0 | 3.35 V | None |
| B03 FIG. 3 | | — | SOCl2 | — | Neg < Pos | 1.0 | 3.35 V | None |
| IP-24 FIG. 4 | | — | SOCl2 | — | Neg < Pos | 1.8 | 3.45 V | None |
| D1-20 FIG. 5 | Present invention | Nitrobenzene | SOCl2 | SOCl2:NB = 1:1 | Neg > Pos | 1.0 | 3.35 V | 2.95 V |
| D1-05 FIG. 6 | | Nitrobenzene | SOCl2 | SOCl2:NB = 0.30:1 | Neg > Pos | 1.0 | 3.35 V | 2.85 V |
| IP-25 FIG. 7 | Without greater charge capacity | Nitrobenzene | SOCl2 | SOCl2:NB = 1:1 | Neg < Pos | 1.0 | 3.40 V | None |
| IP-28 FIG. 8 | Without any or sufficient first solvent in cathodic solution | — | SOCl2 | — | Neg > Pos | 1.0 | 3.40 V | None |
| D1-03 FIG. 9 | | Nitrobenzene | SOCl2 | SOCl2:NB = 2:1 | Neg > Pos | 1.0 | 3.35 V | None |
| IP-30 FIG. 9 | | Nitrobenzene | SOCl2 | SOCl2:NB = 2:1 | Neg > Pos | 1.8 | 3.45 V | None |
| IP-50 FIG. 10 | With a higher initial electrolyte salt concentration | Nitrobenzene | SOCl2 | SOCl2:NB = 0.30:1 | Neg > Pos | 2.4 | 3.50 V | None |
| D4-28 FIG. 11 | Present invention | Thiophosphoryl chloride | SOCl2 | SOCl2:PSCl3 = 1:1 | Neg > Pos | 1.0 | 3.50 V | 3.25 V |

200 hours. There is no loss in functionality with the present invention compared to the energy density and power capability of the prior art batteries in FIGS. 3-4.

FIGS. 5-6 and 11 further show the battery system of the present invention with a plurality of discharge voltage plateaus and an initial electrolyte salt concentration less than 2.4M. There is a transition from a first higher discharge voltage plateau to a second lower discharge voltage plateau or overall slower rate of voltage decrease as the battery expires. There is a first discharge voltage plateau with thionyl chloride as the second solvent composition in the cathodic solution at 3.35V in FIG. 5, 3.35V in FIG. 6, and 3.50V in FIG. 11, and there is a second discharge voltage plateau with the first solvent composition in the cathodic solution at 2.85V in FIG. 5, 2.95V in FIG. 6, and 3.25V in FIG. 11. Each plateau has voltage level range of at least 0.20V or an average voltage +/−0.10V for at least 5% of total battery capacity. In FIG. 11, the range of the first discharge voltage plateau is 0.10V (3.50V+/−0.05V) and the range of the second discharge voltage plateau is also 0.10V (3.25V+/−0.05V). In FIGS. 5, 6, and 11, the corresponding first discharge voltage plateaus are defined by a voltage level range of at least 0.10V or an average voltage +/−0.05V, and the corresponding second discharge voltage plateaus are defined by a voltage level range of at least 0.20V or an average voltage +/−0.10V. In FIGS. 5-6, the range of the first discharge voltage plateau is smaller than the range of the second discharge voltage plateau. The first discharge voltage plateau can have a range of 0.10V (3.35V+/−0.05V), while the second discharge voltage plateau has a range of 0.20V (2.85V+/−0.1V and 2.95V+/−0.1V). There is the first discharge voltage plateau as an initial sufficient power for an external device, and there is the second discharge voltage plateau lower than the first discharge voltage plateau. The second discharge voltage plateau may still be sufficient power for the external device. There is no disruption to the external device with the transition from the first discharge voltage plateau to the second discharge voltage plateau.

Cell D1-20 in FIG. 5 has a solvent volume ratio of 1:1 between thionyl chloride and nitrobenzene, and the second discharge voltage plateau is about 9% of total battery capacity. Cell D1-05 in FIG. 6 has a solvent ratio of 0.3:1 between thionyl chloride and nitrobenzene. The second discharge voltage plateau becomes longer as show in FIG. 6, with 27% of total battery capacity as the second discharge voltage plateau. Cell D4-28 in FIG. 11 has the solvent ration of 1:1 between thionyl chloride and thiophosphoryl chloride as the first solvent composition. There is a first discharge voltage plateau around 3.50V for 45% capacity, and a second discharge voltage plateau around 3.25V for 43% capacity. The transition from the first discharge voltage plateau to the second discharge voltage plateau in FIGS. 5-6 is at least 0.15V for easy detection of voltage decay. Hence, battery users or a battery management system can easily estimate the remaining battery capacity, simply based on voltage value decay. Downhole drilling tasks can be planned in advance for power usage, when the transition from a higher discharge voltage plateau to a lower discharge voltage plateau is detected. Cell D4-28 in FIG. 11 further shows a slower drop to 0V for the remaining 12% capacity, which may include a possible third discharge voltage plateau around 2.80V for less than the remaining 12% capacity. The transition of 0.45V (3.25V to 2.80V) may even be easier to detect as a larger transition. The transition from the second discharge voltage (3.25V) to the possible third discharge voltage plateau (2.80V) in FIG. 11 may also be detectable as an additional estimate of remaining battery capacity. The detection of the larger transition can be utilized as an additional estimate of remaining battery capacity before a prepared battery power shutdown by a battery management system or battery user. The volume ratio of the second solvent composition to the first solvent composition is less than 2:1. FIGS. 5, 6 and 11 show an embodiment with the volume ratio as less than 2:1, particular embodiments being 1:1 and 0.3:1. There is a sufficient amount of the first solvent composition generating at least 5% of total battery capacity during a lower discharge voltage plateau.

In embodiments of the present invention, the cathodic solution 400 comprises a first solvent composition, a second solvent composition, and an electrolyte salt. The solvent compositions are dynamic. The initial chemical compounds undergo chemical reactions, so the amounts are constantly changing. Initial chemical compounds decrease, and reaction products increase. It is possible that those reaction products generate additional reaction products from additional chemical reactions that were not initial available when the solvent compositions were loaded into the battery cell 10. At any time after initial formation, the first solvent composition may be comprised of initial chemical compounds, reaction products, and additional reaction products. Similarly, the second solvent composition may be comprised of respective initial chemical compounds, respective reaction products, and respective additional reaction products. There can be overlap between the reaction products and additional reaction products of the first solvent composition and the respective reaction products and respective additional reaction products of the second solvent composition. The solvent compositions are not static. However, the solvent ratio of the present invention refers to the initial solvent ratio of the second solvent composition to the first solvent composition as less than 2:1. As used in the present disclosure, the recited solvent compositions refer to at least an initial chemical compound, such as the first solvent composition being comprised of nitrobenzene as an initial chemical compound and the second solvent composition being comprised of thionyl chloride as an initial chemical compound.

FIG. 7 shows the remaining criticality of the components of the present invention as claimed. Cell IP-25 in FIG. 7 shows the invention without the electrode metal charge capacity higher than the total positive charge capacity. There is too little lithium, and the battery system with only the claimed cathodic solution and an appropriate initial electrolyte salt concentration value cannot achieve the invention as claimed. The voltage discharge has the same rapid decay as the prior art. Cells D1-20, D1-05, and D4-28 in FIGS. 5-6 and FIG. 11 show the plurality of discharge voltage plateaus and the greater charge capacity of the negative electrode with an initial electrolyte salt concentration less than 2.4M, specifically 1.0M, to successfully to provide power without any safety issue.

Embodiments of the present invention include the cathodic solution 400 being comprised the first solvent composition, the second solvent composition, and the electrolyte salt with an initial volume ratio between the second solvent composition to the first solvent composition less than 2:1. Cells D1-20 (FIG. 5), D1-05 (FIG. 6), and D4-28 (FIG. 11) show the present invention in the volume ratio less than 2:1 for the second solvent composition to the first solvent composition. Cells IP-28 (FIG. 8), D1-03 (FIG. 9), IP-30 (FIG. 9), B2 (FIG. 3), B3 (FIG. 3), and IP-24 (FIG. 4) show battery systems cannot achieve the invention as claimed outside of the claimed volume ratio range.

Embodiments of the present invention include the cathodic solution 400 being comprised the first solvent composition, the second solvent composition, and the electrolyte salt with an initial electrolyte concentration less than 2.4 M per liter. Cells D1-20 (FIG. 5), D1-05 (FIG. 6), and D4-28 (FIG. 11) show the present invention in the initial electrolyte concentration of 1.0 M. Cell IP-50 (FIG. 10) shows that battery systems cannot achieve the invention as claimed outside of the claimed initial electrolyte salt concentration. Cells D1-20 (FIG. 5), D1-05 (FIG. 6), and D4-28 (FIG. 11) show the present invention with the first discharge voltage plateau greater than 3.30V and another lower discharge voltage plateau.

FIGS. 8-9 show the criticality of the volume ratio of the present invention. Cell IP-28 in FIG. 8 has no first solvent composition and greater charge capacity in the negative electrode. The multiple discharge voltage plateaus cannot be achieved. Cell D1-03 and Cell IP-30 in FIG. 9 have solvent volume ratios of 2:1 and greater charge capacity in the negative electrode, which similarly have rapid drops from the first discharge voltage plateau. The rapid drops in FIG. 9 are not as rapid as FIG. 3-4, but there is no cell voltage for more than 5% total battery capacity to be considered a discharge voltage plateau of the present invention. There are almost plateaus at 2.8V and 2.9V, but these voltages were not discharged for enough of total battery capacity. Even if there is a slightly less rapid drop, the slightly less rapid drop is not practically useful either.

FIG. 10 shows the criticality of the initial electrolyte salt concentration, according to the present invention. The initial electrolyte salt concentration is lower than 2.4 M. Cell IP-50 has an initial electrolyte salt concentration of 2.4M per liter, specifically LiAlCl$_4$. As the battery discharges, more and more of the second solvent composition (thionyl chloride) is consumed. The effective electrolyte concentration increases. An initial electrolyte salt concentration, that is too high, can result in an effective over-saturation of electrolyte salt in the cathodic solution with consumption of thionyl chloride during discharge. The over-saturation can result in electrolyte salt precipitation on the negative electrode, the separator, the positive electrode or any other component in contact with the cathodic solution. The precipitation increases cell resistance and can even cause cell reversal, resulting in a safety accident. Cell IP-50 in FIG. 10 with initial electrolyte salt concentration at 2.4M per liter shows a rapid drop off and no other discharge voltage plateaus, even though Cell IP-50 has the solvent ratio and greater negative charge capacity of the present invention. Cells D1-20, D1-05, and D4-28 in FIGS. 5-6 and FIG. 11 show the plurality of discharge voltage plateaus with an initial electrolyte salt concentration less than 2.4M, specifically 1.0M, to successfully to provide power without any safety issue.

In embodiments of FIG. 1, the negative electrode 100 can be electrochemically oxidized to metal ions in the cathodic solution 400. The metal ions transport through the separator layer 200 into the positive side 16, participating in electrochemical reduction reactions with active materials in the positive side 16. Relative to the external electric application device 20, electrons generated form the metal anode pass through the negative terminal 14 to an external electric application device 20, through the external electric application device 20 to the positive terminal 12 so as to complete electrochemical reduction reaction at the carbon electrode 300.

The method further includes dissolving the electrolyte salt in the cathodic solution 400 so as to form metal cations and anions. The first solvent composition is miscible and stable with the second solvent composition, and the first solvent composition dissolves electrolyte salts with or without the second solvent composition. For downhole drilling applications, battery systems experience higher temperature above room temperature, typically between 125° C. and 200° C. The first solvent composition, such as nitrobenzene with a boiling point of 210° and thiophosphoryl chloride with a boiling point of 125° C., is preferred to have a boiling point higher than a boiling point of the second solvent composition, such as thionyl chloride with a boiling point of 74.6° C. and sulfuryl chloride with a boiling point of 69.4° C. The difference in boiling points reduces battery internal vapor pressure to minimize battery safety risks. When the second solvent composition, such as thionyl chloride is consumed, the reactions in the battery cell 10 are not complete and the battery system can continue to provide significant useful capacity to the external application devices. The method includes passing the metal cations through the separator layer 200 from the negative electrode 100 in the negative side 18 of the battery cell 10 so as to complete an electrochemical reduction of a portion of the first solvent at the positive side. Both the first solvent and the second solvent are energy-active chemicals and can be electrochemically reduced at the positive side. Hence, battery cell 10 still provides electricity to the external electric application device 20 through a reaction pathway different from thionyl chloride as the second solvent composition.

To improve energy density and power capacity, more energy active materials must be packed in the fixed battery volume. Energy density of thionyl chloride also depends on battery resistance, discharge application current density or power density, electrode properties, and other factors. Additives in the cathodic solution can include improvements to battery energy density at higher discharge rates. The present invention includes a first solvent composition identified by a relationship to the second solvent composition. The second solvent composition is first consumed by the reaction at the positive electrode providing an initial higher battery discharge voltage plateau. It is followed by a portion of first solvent reacted at the positive electrode generating a lower voltage plateau. The hybrid battery of the present invention includes two electrochemical reactions working to provide battery power. The metal anode charge capacity as the negative charge capacity is higher than the total positive electrode charge capacity from the second solvent and the first solvent in the cathodic solution. The subsequent discharge voltage plateau is lower than the initial high battery discharge voltage plateau, but still sufficient to power the external device. Each plateau can have a voltage range of 0.2V or less for at least 5% total battery capacity. The transitions between plateaus can be detected. Battery users can estimate remaining battery capacity (or service hours) and prepare battery workload before battery replacement when the transition between the two discharge voltage plateaus is detected. A working and safe battery is defined by cathodic solution's charge capacity ratio to anode charge capacity, volume ratio between the first solvent and the second solvent, and initial electrolyte salt concentration.

Embodiments of the present invention include the method for powering. The method includes connecting an external electric application device to the battery cell with multiple discharge voltage plateaus and greater charge capacity of the negative electrode at both the negative terminal and the positive terminal of the battery cell. The plurality of discharge voltage plateaus is comprised of a first discharge voltage plateau, and a second discharge voltage plateau. The transition to the second discharge voltage plateau from the first discharge voltage plateau is at least 0.150V lower than said first discharge voltage plateau. The method further includes generating the first discharge voltage plateau by reactions with the electrode metal and the second solvent composition and generating the second discharge voltage plateau by reactions with the electrode metal and the first solvent composition. The battery cell is sufficient to power the external device for at least the portion of total battery capacity of the first discharge voltage plateau. The method of powering can further include completely reacting the second solvent composition so as to transition from the first discharge voltage plateau to said second discharge voltage plateau. Detecting the transition from the first discharge voltage plateau to said second discharge voltage plateau indicates the status of the total battery capacity remaining in the battery cell. With new knowledge of the impending loss of battery power, battery users or battery management systems can plan battery power usage related tasks in advance. Negative impact to the external device and even a battery safety incident due to sudden forced battery reversal can now be avoided. In addition, a battery charge counting device to estimate battery capacity is not needed.

The present invention is more than simply additive solvents of the prior art. The amount of initial energy-active materials or chemicals still determines the battery capacity, just as in prior art non-hybrid batteries. The present invention is a critical balance to have both multiple discharge voltage plateaus and the greater capacity of the negative electrode. The ratio of the second solvent composition to the first solvent composition must be less than 2:1 and the initial electrolyte salt concentration must be less than 2.4M per liter. Outside of this balance, the present invention cannot be achieved. The wrong ratio of the solvent compositions can result in the subsequent discharge voltage plateau being so small that it is not even a plateau, but rather another drop. There would be no functionality as a battery with a warning to battery users. Similarly, the wrong amount of initial electrolyte salt concentration results in failure for a cell with multiple discharge voltage plateaus and the greater capacity of the negative electrode.

The present invention provides a safe hybrid battery system with multiple discharge voltage plateaus and greater charge capacity of metal in the negative electrode, while still having sufficient energy density and sufficient power capability to supply external devices. Batteries of the present invention can power the same devices as prior art lithium batteries. The present invention is safe, despite the prior art teaching against too much lithium metal and too little thionyl chloride. In particular, the battery system of the present invention has a charge capacity of the negative side higher than a charge capacity of the positive side, specifically including the charge capacity of metal in the negative electrode being higher than a charge capacity of the positive cathodic solution. The present invention is an important innovation that challenges the conventional acceptance of less lithium and more thionyl chloride in order to have a safe and powerful battery.

The foregoing disclosure and description of the invention is illustrative and explanatory thereof. Various changes in the details of the illustrated structures, construction and method can be made without departing from the true spirit of the invention.

We claim:

1. A battery system, comprising:
   a battery cell being comprised of a negative terminal and a positive terminal;
   a negative electrode being comprised of an electrode metal and being connected to said negative terminal;
   a carbon electrode being comprised of carbon materials and being connected to said positive terminal, said carbon electrode having porous structures;
   a separator layer between said negative electrode and said carbon electrode so as to divide said battery cell into a negative side and a positive side, said negative electrode being positioned in said negative side, said carbon electrode being positioned in said positive side; and
   a cathodic solution within said battery cell and in contact with said negative electrode, said separator layer, and said carbon electrode,
   wherein said cathodic solution comprises a first solvent composition, a second solvent composition, and an electrolyte salt,
   wherein said electrode metal has an electrode metal charge capacity,
   wherein said cathodic solution has a positive charge capacity,
   wherein said electrode metal charge capacity is higher than said positive charge capacity,
   wherein said battery cell has a plurality of discharge voltage plateaus,
   wherein said plurality of discharge voltage plateaus is comprised of a first discharge voltage plateau, and a second discharge voltage plateau, said second discharge voltage plateau being lower than said first discharge voltage plateau,
   wherein said second solvent composition is comprised of at least one of a group consisting of thionyl chloride, and sulfuryl chloride,
   wherein said cathodic solution has an initial electrolyte salt concentration less than 2.4M per liter so as to generate said first discharge voltage plateau by reactions with said electrode metal and said second solvent composition and generate said second discharge voltage plateau only by reactions with said electrode metal and said first solvent composition.

2. The battery system, according to claim 1, wherein each discharge voltage plateau is at least 5% of total battery capacity.

3. The battery system, according to claim 1, wherein each discharge voltage plateau has a range of 0.2V.

4. The battery system, according to claim 1, wherein said electrode metal is comprised of one of a group consisting of an alkaline metal and an alkaline earth metal.

5. The battery system, according to claim 1, wherein said electrode metal is in an alloy.

6. The battery system, according to claim 1, wherein said carbon electrode is further comprised of inert polymer binders.

7. The battery system, according to claim 1, wherein said separator is comprised of one of a group consisting of: glass fiber and a polymer.

8. The battery system, according to claim 1, wherein said first solvent composition is comprised of at least one of a group consisting of nitrobenzene, 2-nitro-m-xylene, 4-nitro-m-xylene, benzoyl chloride, 2-methylbenzoyl chloride, 1-nitropropane, thiophosphoryl chloride, ethylene (glycol) sulfite, 3-methyl-2-oxazoidinone, acetonitrile, dimethyl sulfoxide, trimethyl phosphate, carbon tetrachloride, trichloromethane, benzonitrile, methyl benzoate, gamma-butyrolactone, propylene carbonate, 3-methoxy propionitrile, N, N-dimethylformamide, and dimethoxyethane.

9. The battery system, according to claim 1, wherein said electrolyte salt is comprised of at least one of a group consisting of metal tetrachloroaluminate, metal tetrachlorogallate, Metal tetrachloro borate, metal bis(oxalato)borate, metal bis(trifluoromethanesulfonyl)imide, and metal trifluoromethanesulfonate, metal tetrafluoroborate, and metal hexafluoroarsenate.

10. The battery system, according to claim 1, wherein an initial volume ratio between said second solvent composition to said first solvent composition is less than 2:1.

11. The battery system, according to claim 1, wherein said second discharge voltage plateau is at least 0.150V lower than said first discharge voltage plateau.

12. The battery system, according to claim 11, wherein said first discharge voltage plateau has a range smaller than a range of said second discharge voltage plateau.

13. A method for powering, comprising the steps of:
connecting an external electric application device to said battery cell, according to claim 1, at said negative terminal and at said positive terminal;
generating said first discharge voltage plateau by reactions with said electrode metal and said second solvent composition until said second solvent composition is consumed; and
generating said second discharge voltage plateau only by reactions with said electrode metal and said first solvent composition.

14. The method of powering, according to claim 13, wherein the step of generating said first discharge voltage plateau further comprises the step of:
completely reacting said second solvent composition so as to make a transition from said first discharge voltage plateau to said second discharge voltage plateau.

15. The method of powering, according to claim 14, further comprising the step of:
detecting the transition from said first discharge voltage plateau to said second discharge voltage plateau.

16. The method of powering, according to claim 15, wherein the transition from said first discharge voltage plateau to said second discharge voltage plateau is at least 0.15V.

17. The method of powering, according to claim 13, wherein each discharge voltage plateau of said plurality of discharge voltage plateaus has a range of 0.2V and is at least 5% of total battery capacity.

18. The method of powering, according to claim 13, wherein an initial volume ratio of said second solvent composition to said first solvent composition is less than 2:1.

19. The method of powering, according to claim 13, wherein said first discharge voltage plateau has a range smaller than a range of said second discharge voltage plateau.

* * * * *